United States Patent [19]
Peachey

[11] Patent Number: 6,079,784
[45] Date of Patent: Jun. 27, 2000

[54] ADJUSTABLE BACK SUPPORT PILLOW

[76] Inventor: James L. Peachey, P.O. Box 1165, Lewistown, Pa. 17044

[21] Appl. No.: 09/256,251

[22] Filed: Feb. 23, 1999

Related U.S. Application Data

[60] Provisional application No. 60/092,382, Jul. 10, 1998.

[51] Int. Cl.[7] ................................................. A47C 7/42
[52] U.S. Cl. .................... 297/284.5; 297/284.7; 297/DIG. 6; 5/653; 5/657
[58] Field of Search ............... 297/219.1, 226, 297/228.12, 284.5, 284.7, 397, 399, 400, DIG. 6; 5/633, 652, 653, 631, 657, 922

[56] References Cited

U.S. PATENT DOCUMENTS

| | | |
|---|---|---|
| 1,935,685 | 11/1933 | White . |
| 2,060,298 | 11/1936 | Gailey . |
| 2,756,808 | 7/1956 | Eichorst ................................ 297/399 X |
| 2,831,533 | 4/1958 | Pasquarelli . |
| 3,279,849 | 10/1966 | Radke et al. . |
| 3,446,531 | 5/1969 | Froelich . |
| 4,206,945 | 6/1980 | Kifferstein ..................... 297/DIG. 6 X |
| 4,394,783 | 7/1983 | Simmons .................................. 5/922 X |
| 5,211,696 | 5/1993 | Lacy ............................................ 297/397 |
| 5,297,304 | 3/1994 | O'Sullivan . |
| 5,533,787 | 7/1996 | Xiang . |
| 5,584,422 | 12/1996 | Bond-Madsen . |
| 5,641,199 | 6/1997 | Bond-Madsen . |
| 5,722,725 | 3/1998 | McNaughton ........................ 297/284.5 |
| 5,906,413 | 5/1999 | Yang ................................. 297/219.1 X |

FOREIGN PATENT DOCUMENTS

| | | | |
|---|---|---|---|
| 2194883 | 3/1988 | United Kingdom ................... 297/397 |

Primary Examiner—Peter R. Brown
Attorney, Agent, or Firm—John J. Elnitski, Jr.

[57] ABSTRACT

The present invention is an adjustable back support pillow for vehicle seats, especially automobile seats, but can also be used on other seats. Other seat examples are aircraft seats, boat seats or common indoor/outdoor chairs for the home and office. The main components of the adjustable back support pillow are a pillow, lower attachment section and an upper attachment section. The adjustable back support pillow provides for easy attachment to seats, which allows easy portability between different seats. The adjustable back support pillow allows for easy adjustment of the pillow for proper back support of different users.

17 Claims, 5 Drawing Sheets

ADJUSTABLE BACK SUPPORT PILLOW

This application claims the benefit of U.S. Provisional Application No.: 60/092,382 filed Jul. 10, 1998.

BACKGROUND

Consumers are constantly on the lookout for a back support pillow that can be used with an automobile seat. Currently, no single add-on pillow has commanded the market and satisfied the consumer desiring lower back support in an automobile. The features believed to be desired in a back support pillow by the consumer are cost, expense, adjustability, portability and ease of use.

It is an object of the present invention to provide an adjustable back support pillow that is relatively inexpensive;

It is an object of the present invention to provide an adjustable back support pillow that is adjustable for different users and different seats;

It is an object of the present invention to provide an adjustable back support pillow that is portable; and Finally, it is an object of the present invention to provide an adjustable back support pillow that is easy for the consumer to use.

SUMMARY

The present invention is an adjustable back support pillow attached to a vehicle seat. The main components of the adjustable back support pillow are a pillow, lower attachment section and an upper attachment section. The back support pillow also includes side straps and a retaining rod. The pillow attaches to the lower attachment section. The lower attachment section can include a pillow pocket to receive the pillow. The pillow provides lower back support to the user. The side straps are attached to each side of the lower attachment section. Each side strap includes VELCRO on an end of the side strap. Attached to the front side of the lower attachment section are VELCRO strips. The upper attachment section includes Velcro strips attached to the back of the upper attachment section. The upper attachment section also includes cylindrical shaped loop attached to the top of the upper attachment section to receive the retaining rod. The loop can be of a different material or of the same material as the upper attachment section. The loop includes one or more gaps for fitting of the loop past the support(s) of the seat.

DETAILED DESCRIPTION

The present invention is an adjustable back support pillow for vehicle seats, especially automobile seats, but can also be used on other seats. Other seat examples are aircraft seats, boat seats or common indoor/outdoor chairs for the home and office. The adjustable back support pillow provides for easy attachment to seats along with easy adjustment to properly fit the user. The adjustable back support pillow allows for easy portability between different seats. The following will describe adjustable back support pillow and its use in detail with reference to FIGS. 1–5.

Figure 1:
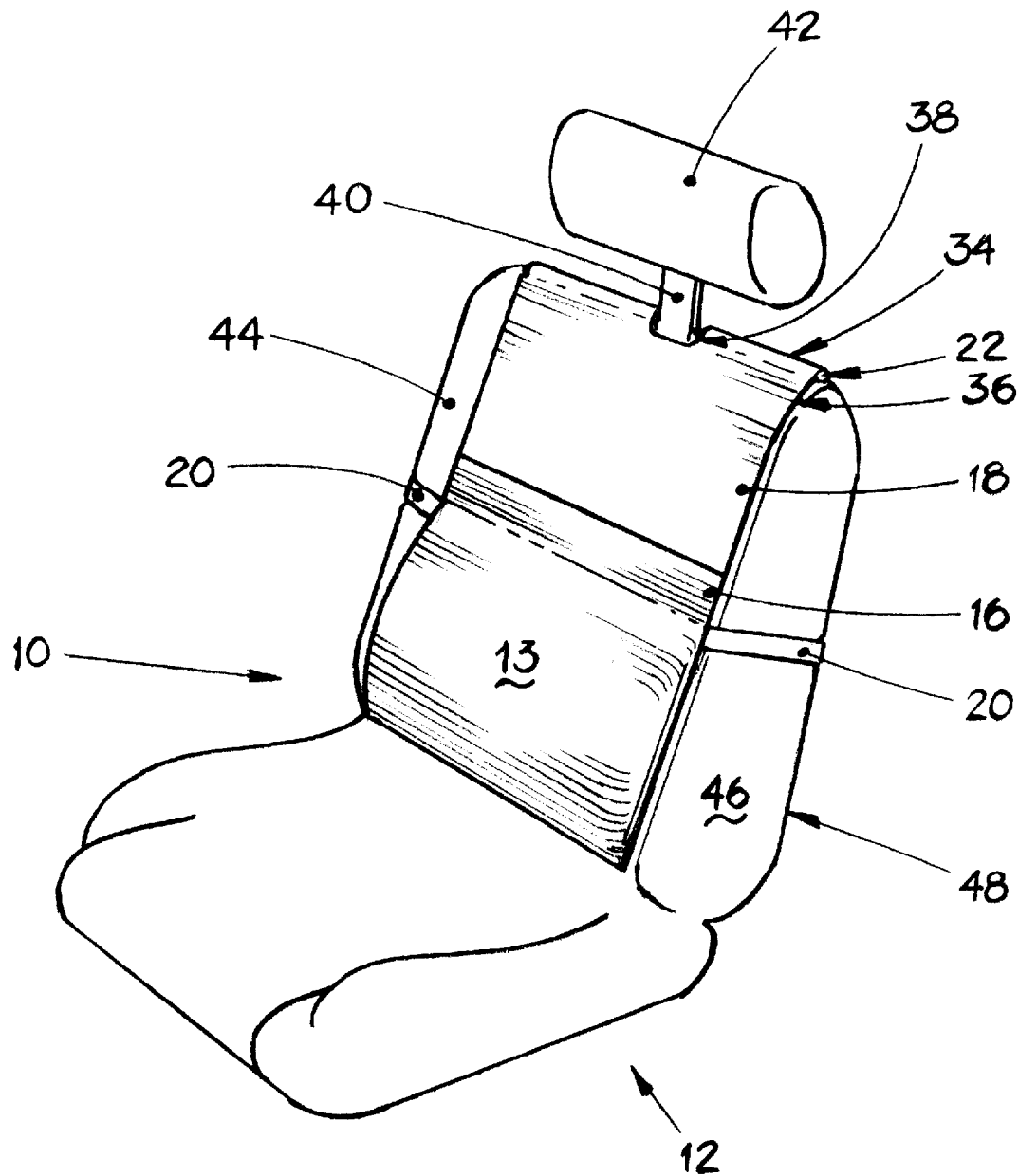
FIG. 1 is a front perspective view of an adjustable back support pillow attached to a car seat according to the present invention.
Figure 2:
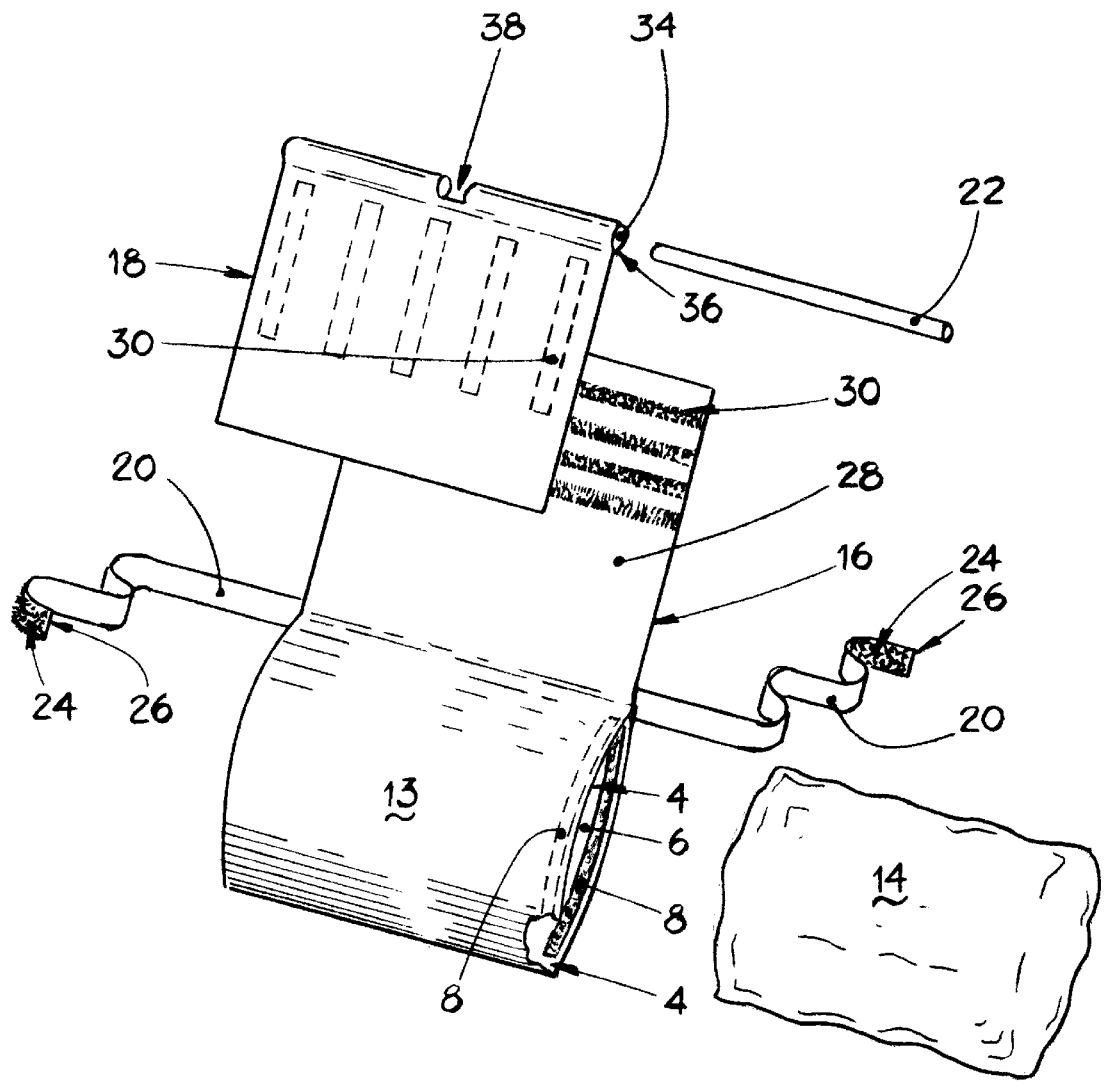
FIG. 2 is a perspective exploded view of the adjustable back support pillow shown in FIG. 1.
Figure 3:
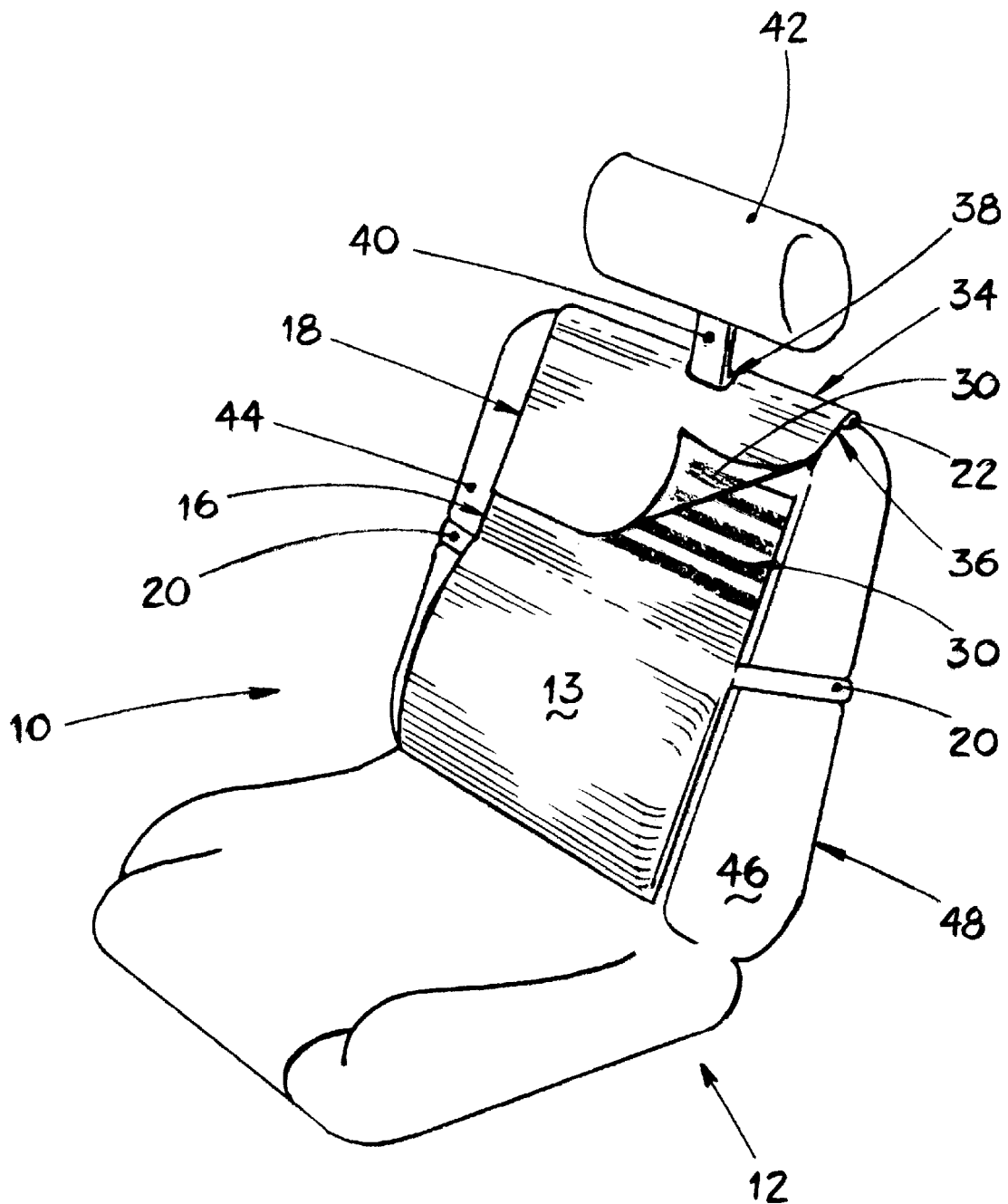
FIG. 3 is another front perspective view of the adjustable back support pillow attached to the car seat shown in FIG. 1.
Figure 4:
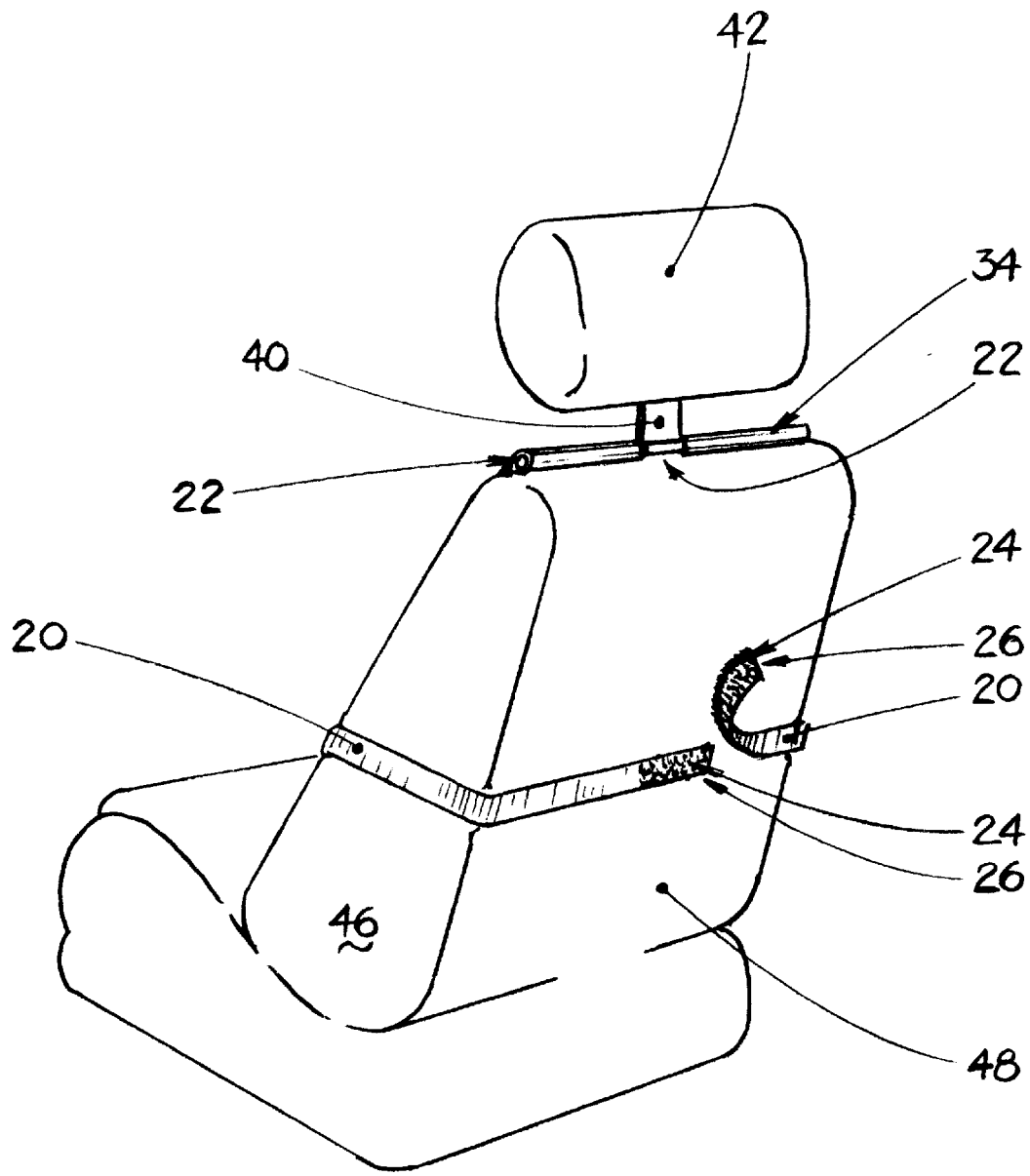
FIG. 4 is a rear perspective view of the adjustable back support pillow attached to the car seat shown in FIG. 1.
Figure 5:
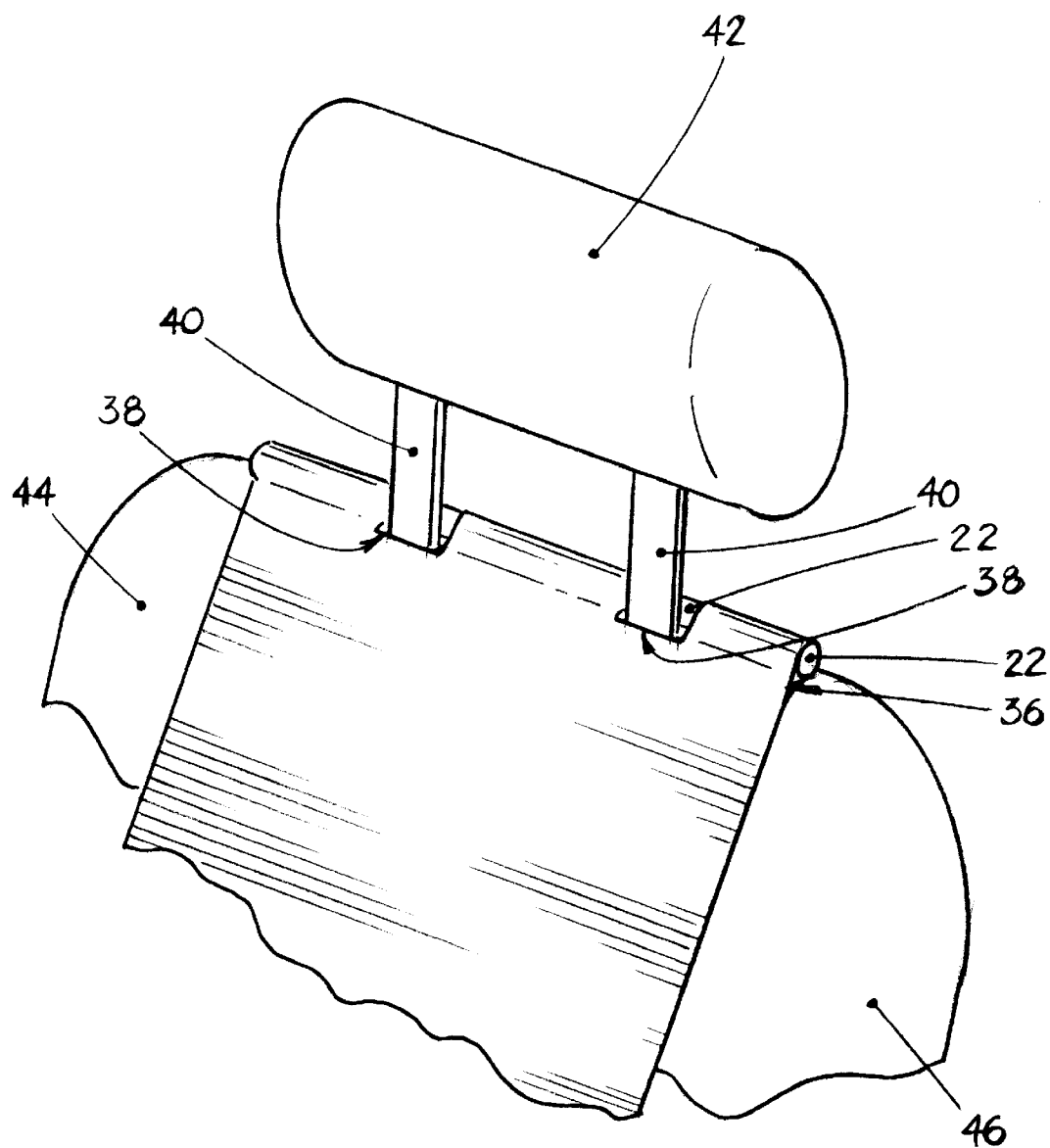
FIG. 5 is a perspective view of a loop and retaining rod attached about a head rest of a seat according to the present invention.

FIG. 1 shows the adjustable back support pillow 10 attached to a vehicle seat 12. The main components of the adjustable back support pillow 10 are shown in FIG. 2. The main components are a pillow pocket 13, pillow 14, lower attachment section 16, upper attachment section 18, side straps 20 and retaining rod 22. All of the main components, except for the retaining rod 22, can be made from fabric. The pillow pocket 13 is attached to the lower attachment section 16 and holds the pillow 14. The pillow pocket 13 includes an opening 6 to receive the pillow 14. The opening 6 includes two sides 4 which define the opening 6. The sides 4 include VELCRO strips 8 for closing the opening 6. The pillow 14 provides lower back support to the user. A side strap 20 is attached to each side of the lower attachment section 16. Each side strap 20 includes VELCRO 24 on an end 26 of the side strap 20. Also, attached to the front side 28 of the lower attachment section 16 are VELCRO strips 30. The upper attachment section 18 includes VELCRO strips 30 attached to the back 32 of the upper attachment section 18. The upper attachment section 18 also includes cylindrical shaped loop 34 attached to the top 36 of upper attachment section 18. The loop 34 can be of a different material or of the same material as the upper attachment section 18. As shown in FIGS. 1–5, the loop 34 includes one or more gaps 38 for fitting of the loop 34 past the support(s) 40 of the head rest 42 of the seat 12. Each gap 38 is as wide as needed to allow attachment around the headrest 42 of the seat 12. The gap 38 can be sized to fit around a non-adjustable head rest found on many seats and chairs (not shown).

Attachment of the adjustable back support pillow 10 to a seat 12 is as follows. The upper attachment section 18 is placed on the front 44 of an upper portion 46 of the seat 12. The upper attachment section 18 is placed so that the gap(s) 38 fit around the headrest support(s) 40 or the headrest (not shown). Next, the retaining rod 22 is slipped into the loop 34 so that the rod 22 is behind the headrest support(s) 40 or headrest. The retaining rod 22 and loop 34 combination thereby retains the upper attachment section 18 to the seat 12 using the headrest support(s) 40 or headrest. The lower attachment section 16 is positioned on the front 44 of the upper portion 46 of the seat 12 and below the upper attachment section 18. The lower attachment section 16 is positioned so that the pillow 14 in the pillow pocket 13 is at the proper height to provide lower back support to the user. The lower attachment section 16 is placed under the upper attachment section 18 so that the VELCRO strips 30 of each can be connected. The Velcro strips 30 are used to attach the lower attachment section 16 to the upper attachment section 18 and thereby to the seat 12. The VELCRO strips 30 of the lower attachment section 16 and the upper attachment section 18 are shown running perpendicular to each other to promote maximum adjustability of the pillow height. The side straps 20 are then wrapped around the back 48 of the upper portion 46 of the seat 12. The VELCRO 24 on the ends 26 of the side straps 20 are connected together so that the straps 20 are wrapped tightly around the seat 12. The side straps 20 are used to secure the lower attachment section 16 in place and prevent side to side movement of the pillow pocket 13. The pillow 14 can be inserted into the pillow pocket 13 at any time by pulling apart the sides 4 held together by the VELCRO strips 8. Pulling apart the sides 4 creates the opening 6. The pillow 14 is then inserted into the pillow pocket 13 through opening 6. The pillow 14 inserted in the pillow pocket 13 can be any type of cushion which varies in material, thickness and firmness to effect lower back support of the user. The pillow 14 provides a support which conforms to the body of the user due to the inherent properties of a pillow, and can easily be adjusted for a new user or use with a different seat. The present invention can also include a pillow 14 which does not utilize a pillow pocket 14, but connects directly to the lower attachment section 16. Envisioned is a cushion (not shown) which attaches directly to the lower attachment section using VELCRO.

While different embodiments of the invention has been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. An adjustable back support which is mounted to an upper portion of a seat comprising:

a lower attachment section having a top, bottom, front side between said top and bottom of said lower attachment section, and a rear side between said top and bottom of said lower attachment section;

an upper attachment section which is secured at an upper edge to said upper portion, for the attachment and support of said lower attachment section to said upper portion, said upper attachment section having a top, bottom, front side between said top and bottom of said upper attachment section, and a rear side between said top and bottom of said upper attachment section;

a hook-and-loop fastener on said rear side of said upper attachment section;

a hook-and-loop fastener on said front side of said lower attachment section to mate with said hook-and-loop fastener on said rear side of said upper attachment section in order to adjustably attach said upper attachment section to said lower attachment section by mating said rear side of said upper attachment section with said front side of said lower attachment section; and a cushion attached to said lower attachment section for providing back support.

2. The back support of claim 1, wherein said cushion is a pillow attached to said lower attachment section.

3. The back support of claim 1, wherein said lower attachment section includes a pocket to receive said cushion.

4. The back support of claim 3, wherein said pillow pocket includes an opening to receive said cushion, said opening including opening sides and wherein said opening sides are fastened together to retain said cushion.

5. The back support of claim 1, further including at least one strap extending from each of said sides of said lower attachment section for securing said back support to said seat, said straps having a free end.

6. The back support of claim 5, wherein said straps include mating hook-and-loop fastener on each of said free ends which allows said straps to be connected together about said seat.

7. The back support of claim 1, wherein said lower attachment section and said upper attachment section includes mating hook-and-loop fastener for attaching said lower attachment section to said upper attachment section so that said position of said lower attachment section is adjustable, thereby providing adjustable positioning of said cushion.

8. The back support of claim 1, further including a loop attached to said top of said upper attachment section and a retaining rod which slides into said loop, said loop and rod used to retain said upper attachment section to said seat.

9. The back support of claim 8, wherein said loop includes at least one gap adapted to allow said loop to fit around a support of said seat.

10. The back support of claim 8, wherein said loop includes at least one gap adapted to allow said loop to fit around a headrest support.

11. The back support of claim 8, wherein said loop includes a plurality of gaps adapted to allow said loop to fit around a plurality of support of said seat.

12. The back support of claim 8, wherein said loop includes a plurality of gaps adapted to allow said loop to fit around a plurality of headrest supports.

13. An adjustable back support for a seat comprising:

an upper attachment section for attachment to a back of said seat, said upper attachment having a top and bottom;

a lower attachment section adjustably attached to said upper attachment section to adjust position of said lower attachment section, said lower attachment section having a top, bottom and two sides;

a cushion attached to said lower attachment section for providing back support;

a loop attached to said top of said upper attachment section; and a retaining rod which slides into said loop, said loop and rod used to retain said upper attachment section to said seat.

14. The back support of claim 13, wherein said loop includes at least one gap adapted to allow said loop to fit around a support of said seat.

15. The back support of claim 13, wherein said loop includes at least one gap adapted to allow said loop to fit around a headrest support.

16. The back support of claim 13, wherein said loop includes a plurality of gaps adapted to allow said loop to fit around a plurality of support of said seat.

17. The back support of claim 13, wherein said loop includes a plurality of gaps adapted to allow said loop to fit around a plurality of headrest supports.

* * * * *